(12) United States Patent
Burton

(10) Patent No.: US 7,496,778 B2
(45) Date of Patent: *Feb. 24, 2009

(54) AUTONOMOUS THERMAL MANAGEMENT

(75) Inventor: Joel S. Burton, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/747,190

(22) Filed: May 10, 2007

(65) Prior Publication Data
US 2007/0214375 A1 Sep. 13, 2007

Related U.S. Application Data

(63) Continuation of application No. 10/800,258, filed on Mar. 11, 2004, now Pat. No. 7,234,067.

(51) Int. Cl.
G06F 1/00 (2006.01)

(52) U.S. Cl. ...................... 713/324; 360/137

(58) Field of Classification Search .......... 713/300–601
See application file for complete search history.

(56) References Cited

U.S. PATENT DOCUMENTS

| 5,719,800 | A  | * | 2/1998  | Mittal et al. ................. 713/321 |
| 6,374,139 | B1 | * | 4/2002  | Er et al. .......................... 607/27 |
| 6,636,910 | B2 | * | 10/2003 | Kung et al. .................... 710/60 |
| 7,002,884 | B2 | * | 2/2006  | Schmidt et al. ........... 369/47.38 |
| 7,234,067 | B2 | * | 6/2007  | Burton ........................ 713/320 |
| 2003/0191889 | A1 | * | 10/2003 | Forrer, Jr. .................... 711/112 |
| 2005/0068653 | A1 | * | 3/2005  | Escobar et al. ................. 360/51 |

* cited by examiner

Primary Examiner—Thomas Lee
Assistant Examiner—Mohammed H Rehman
(74) Attorney, Agent, or Firm—Beyer Law Group LLP

(57) ABSTRACT

The present invention provides both a peripheral device that regulates its own temperature by adjusting its power consumption, and a method to accomplish the same. The method generally includes monitoring the temperature of the mass storage device and reducing power consumption when the temperature exceeds a certain threshold.

15 Claims, 5 Drawing Sheets

AUTONOMOUS THERMAL MANAGEMENT

RELATED APPLICATIONS

This is a continuation application of prior U.S. application Ser. No. 10/800,258 entitled "AUTONOMOUS THERMAL MANAGEMENT", filed on Mar. 11, 2004, now U.S. Pat. No. 7,234,067, issued Jun. 19, 2007, which is incorporated herein by reference and from which priority under 35 U.S.C. § 120 is claimed.

BACKGROUND OF THE INVENTION

1. Field of the Invention

The present invention relates to data storage devices and, more particularly, to temperature management of data storage devices.

2. Description of the Related Art

General-purpose computers require a mass storage system. Unlike main memory, which is used for the direct manipulation of data, mass storage is used to retain data. Generally a program is stored in mass storage and, when the program is executed, either the entire program or portions of the program are copied into main memory. Common mass storage devices include floppy disks, hard disks, optical disks and tapes.

All mass storage devices are designed to operate within certain environmental conditions. Temperature is typically the most important condition. If temperatures exceed the normal operating conditions, the risk of data loss and file corruption increases, as does the potential for total device failure.

In an effort to help users avoid data loss, hard drive manufacturers incorporate logic into their drives that host systems can use to predict pending drive problems. The system is called Self-Monitoring Analysis and Reporting Technology or SMART. The hard disk's integrated controller works with various sensors to monitor various aspects of the drive's performance and makes available status information to software that probes the drive and look at it. SMART monitors disk performance, faulty sectors, recalibration, CRC errors, drive spin-up time, drive heads, distance between the heads and the disk platters, drive temperature, and characteristics of the media, motor and servomechanisms.

The hard drive itself does not actually do anything with SMART data, it merely makes the information available to the host upon request. It is up to the host to request and analyze the data, and typically up to the user to take appropriate action. In other words, a program, such as Norton Utilities from the Symantec Corporation of Cupertino, Calif., is required to initiate a SMART request, utilize the SMART data, and then notify the user of any potential problems.

SMART data is, of course, not the only way to get temperature data from a mass storage device. Temperature sensors from a separate device can be used to probe a mass storage device's temperature. Many commercially available cooling systems that use fans and/or heat sinks to control a hard drive's temperature also use temperature sensors to report temperature to the user.

Although the described technologies work well in many applications, there are continuing efforts to further improve the ability to monitor and regulate device temperatures.

SUMMARY OF THE INVENTION

The present invention provides both a peripheral device that regulates its own temperature by adjusting its power consumption, and a method to accomplish the same. In one embodiment of the invention, the method includes monitoring the temperature of the mass storage device and reducing power consumption when the temperature exceeds a certain threshold. In such an embodiment, the mass storage device would be capable of operating while the power consumption is reduced.

In another embodiment, the method includes reducing offline diagnostic activities if the temperature of the peripheral device exceeds a first temperature, reducing an operational speed in which the peripheral device fulfills requests from a host device if the temperature of the peripheral device exceeds a second temperature and reducing power consumption of a physical layer interface that connects the peripheral device to the host device if the peripheral device exceeds a third temperature and if the peripheral device experienced a period of inactivity that exceeds a first time threshold. In yet other embodiments, the temperature in a hard drive can be further reduced by parking heads of the hard drive if a temperature threshold and a time threshold are exceeded.

In yet other embodiments, a hard drive that autonomously manages its temperature is described. The hard drive includes a hard platter that rotates, a magnetic medium that stores information, heads that read and write information to the magnetic medium, an arm that holds the heads, a temperature sensor that measures temperature and an integrated controller. The integrated controller that can reduce power consumption when the temperature exceeds a certain threshold, wherein the hard drive is capable of operating while the power consumption is reduced.

BRIEF DESCRIPTION OF THE DRAWINGS

The invention may best be understood by reference to the following description taken in conjunction with the accompanying drawings in which.

It is to be understood that, in the drawings, like reference numerals designate like structural elements. Also, it is understood that the depictions in the figures are not necessarily to scale.

DETAILED DESCRIPTION OF THE PREFERRED EMBODIMENTS

In the following description, numerous specific details are set forth to provide a thorough understanding of the present invention. However, it will be obvious to one skilled in the art that the present invention may be practiced without some or all of these specific details. In other instances, well known process steps have not been described in detail in order to avoid unnecessarily obscuring the present invention.

Figure 1A:
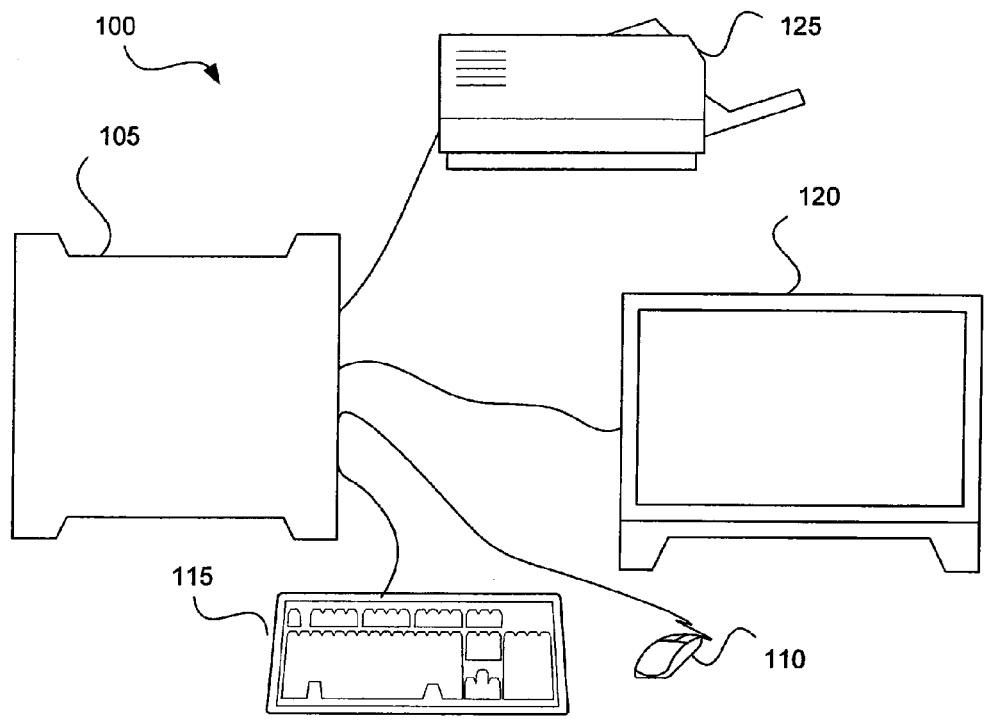
FIG. 1A depicts an exemplary general-purpose computer system that can utilize the invention.

FIG. 1A depicts an exemplary general-purpose computer system 100 that can utilize the current invention. Components include a computer 105, various input devices such as a mouse 110 and keyboard 115, and various output devices such as a monitor 120 and a printer 125.

Figure 1B:
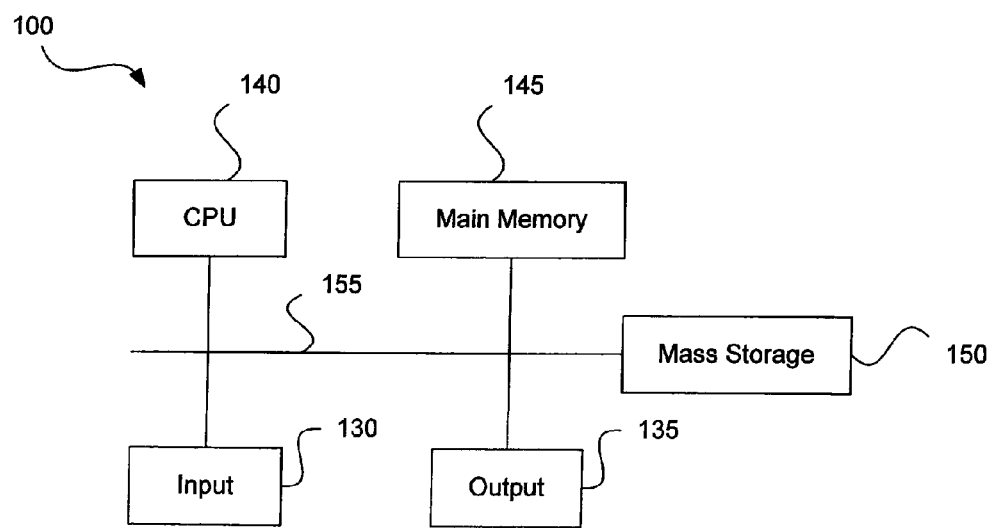
FIG. 1B depicts an abstracted representation of the general-purpose computer system of FIG. 1A.

FIG. 1B depicts an abstracted representation of a computer system 100 of FIG. 1A that depicts its essential components.

A single component 130 represents input devices that allow a user to interact with the computer system 100, such as a mouse and keyboard. Similarly, a single component 135 represents the output devices that display what the computer system 100 has accomplished, such as a monitor and printer. The heart of the computer system 100 is a central processing unit (CPU) 140, and is the component that executes instructions. Main memory 145 is typically volatile and provides the CPU 140 with both the instructions to be executed and data to be manipulated by the instructions. These components 130, 135, 140, and 145 are all well known in the art.

An improved mass storage device 150 allows the computer system 100 to permanently retain large amounts of data. The components 130, 135, 140, 145, and 150 are able to exchange information with each other via a host bus 155.

Figure 2:
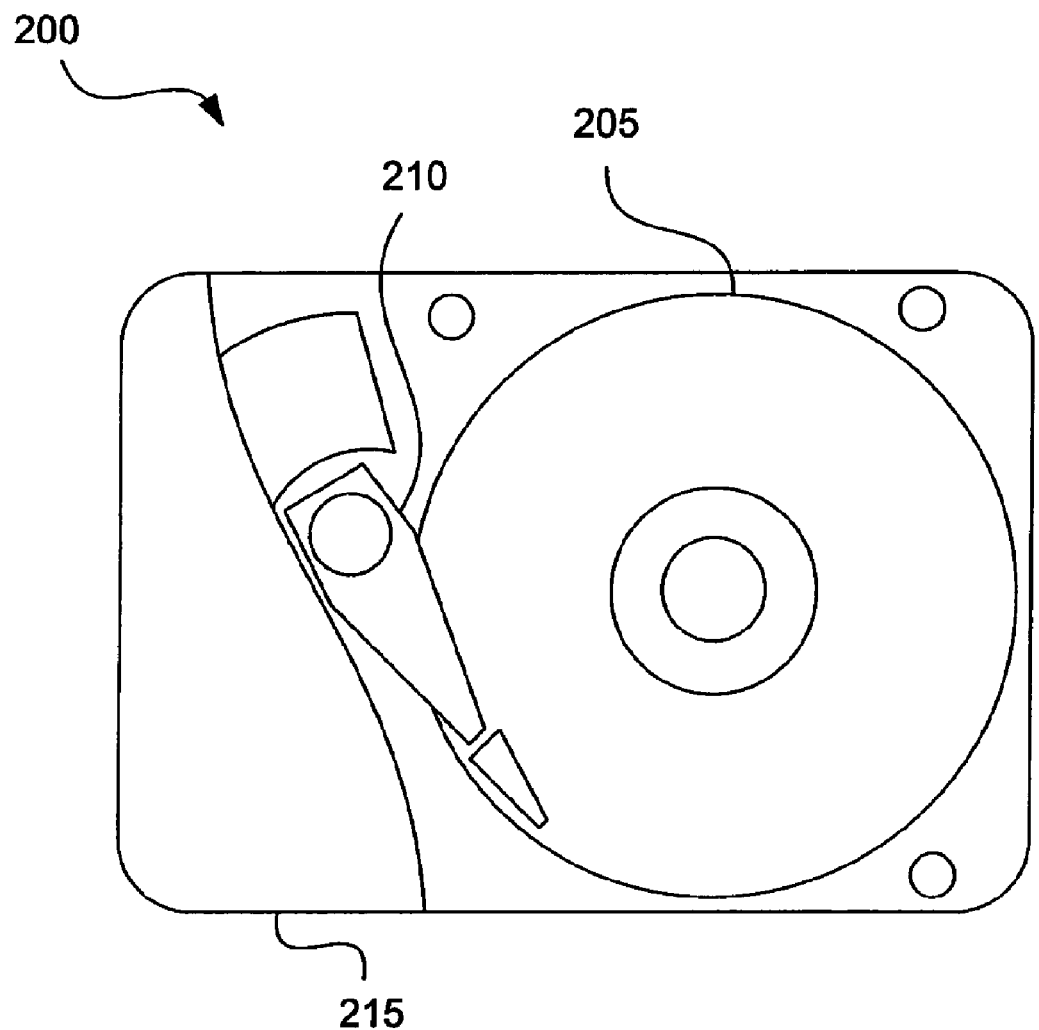
FIG. 2 depicts an improved hard drive, one embodiment of the improved mass storage device of FIG. 1B.

FIG. 2 depicts an improved hard drive 200, which is one embodiment of the improved mass storage device 150. The components that are shown in FIG. 2 are a hard platter 205, which is the spinning disk that holds a magnetic medium that stores information, an arm 210 that holds the read/write heads and is able to move the heads from the hub to the edge of the drive, and a cut-away portion of the disk enclosure 215 that covers and protects the internal components of the hard drive (e.g., 205 and 210).

Different hard drives report different temperatures in response to an appropriate SMART request. Some manufacturers may attach temperature sensors directly to the disk enclosure 215 and report temperatures of the disk enclosure 215. Other manufactures may include temperature sensors in the circuit board that contains the hard drive's integrated controller. Internal temperatures are typically about two degrees hotter than the temperature of the disk enclosure 215. Accordingly, if precision were required when using SMART data, such variations in reporting temperature would need to be accounted for when determining safe operational temperatures.

The improved hard drive 200 preferably has an integrated controller that interprets temperature data and autonomously reduces the device's power consumption. Power is "consumed" in an electric circuit by being converted into other forms of energy—typically heat, light, and/or motion. Reducing power consumption, therefore, has the effect of producing less heat, allowing the device to cool to the ambient temperature.

Table 1 lists exemplary actions that can be taken to reduce power consumption, sorted from the least intrusive to the most intrusive actions.

TABLE 1

| Action | Power (approx.) |
|---|---|
| Suspension of offline activities | 2 W |
| Reduction of seek speed | 2 W |
| Reduction of PHY operating mode (Active to Partial) | 1 W |
| Parking of drive heads | 1.5 W |
| Reduction of PHY operating mode (Partial to Slumber) | 1 W |
| Changing drive state | 4 W |

Although all of the actions listed in Table 1 have some effect on the functionality of the improved hard drive 200, it is generally more important to keep the device within its operating conditions than to have access to full functionality. As previously described, SMART is used for a variety of diagnostic concerns. Under normal conditions, the SMART defect scan is always running as a background operation. However, the improved hard drive 200 has the ability to suspend such offline activities when the device temperature exceeds certain parameters. Although the device looses the ability to identify certain problems, the user's experience is largely unaffected. Once the device temperature falls back into a safe zone, the offline activities can resume.

If the device temperature continues to increase, more intrusive measures can be taken. For example, changing the seek speed from "performance seek mode" to "silent seek mode." Although not all hard drives may have the option to change operating modes, drives available from Seagate Technology, Inc of Scotts Valley, Calif., advertise Sound Barrier Technology or SBT. Although sound appears to have been the main concern for implementing SBT, a byproduct of silent seek mode is less power is consumed.

It should be noted that both suspending offline activities and reducing seek speed could be done without notifying the host system. The host system will treat the improved hard drive 200 the same, regardless of whether offline activities have been suspended and seek speed has been reduced. However, changing the PHY interface's operating mode is an action that would be seen by the host.

Serial ATA specifications define three separate PHY interface modes that are used for power management: active, partial and slumber. The improved hard drive 200 could initiate a reduced-power mode in response to a temperature threshold being reached. Serial ATA allows for either a host or an attached device to initiate a change in the PHY operating mode.

Another mechanism that can be used to reduce the power consumption of the improved hard drive 200 is parking the drive heads and disabling position servo electronics. Normally, a hard drive is configured to keep the read/write heads on track so that information from the same sector can be quickly accessed. However, parking the heads can save power by trading off a bit of speed.

The most intrusive mechanism listed in table 1 is changing the drive state from active to standby. In standby mode, a hard drive's spindle motor is typically disabled. The spindle is the rotating hub structure to which the discs are attached. The spindle motor is the electromechanical part of the disc drive that rotates the platters. Although the spindle motor would need to be enabled before any operations could be performed, temporarily disabling the spindle motors results in a fairly large power reduction.

Figure 3A:
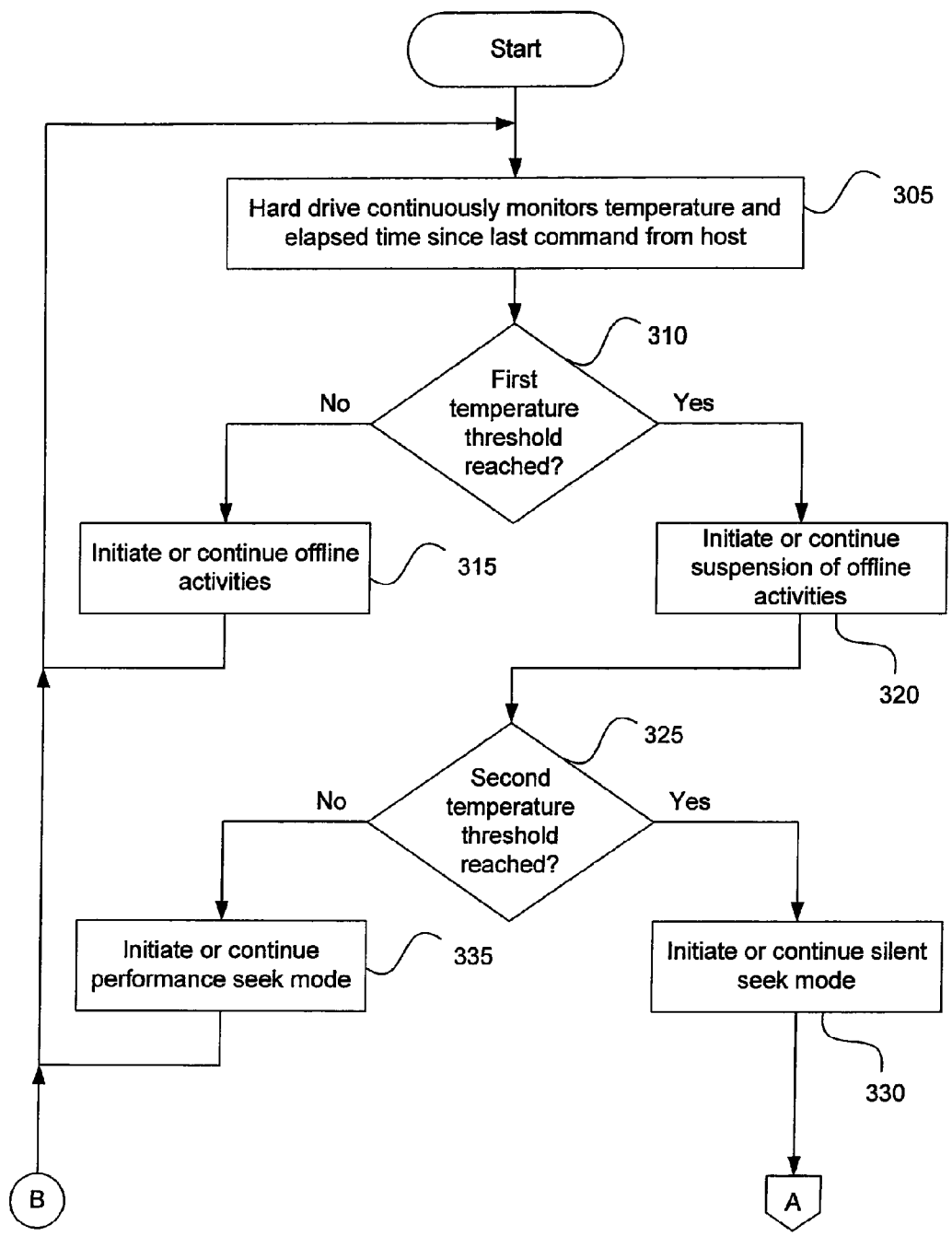
FIGS. 3A through 3C are representational flow charts illustrating one technique that can be used to implement various power-reduction mechanisms in the improved hard drive of FIG. 2.
Figure 3B:
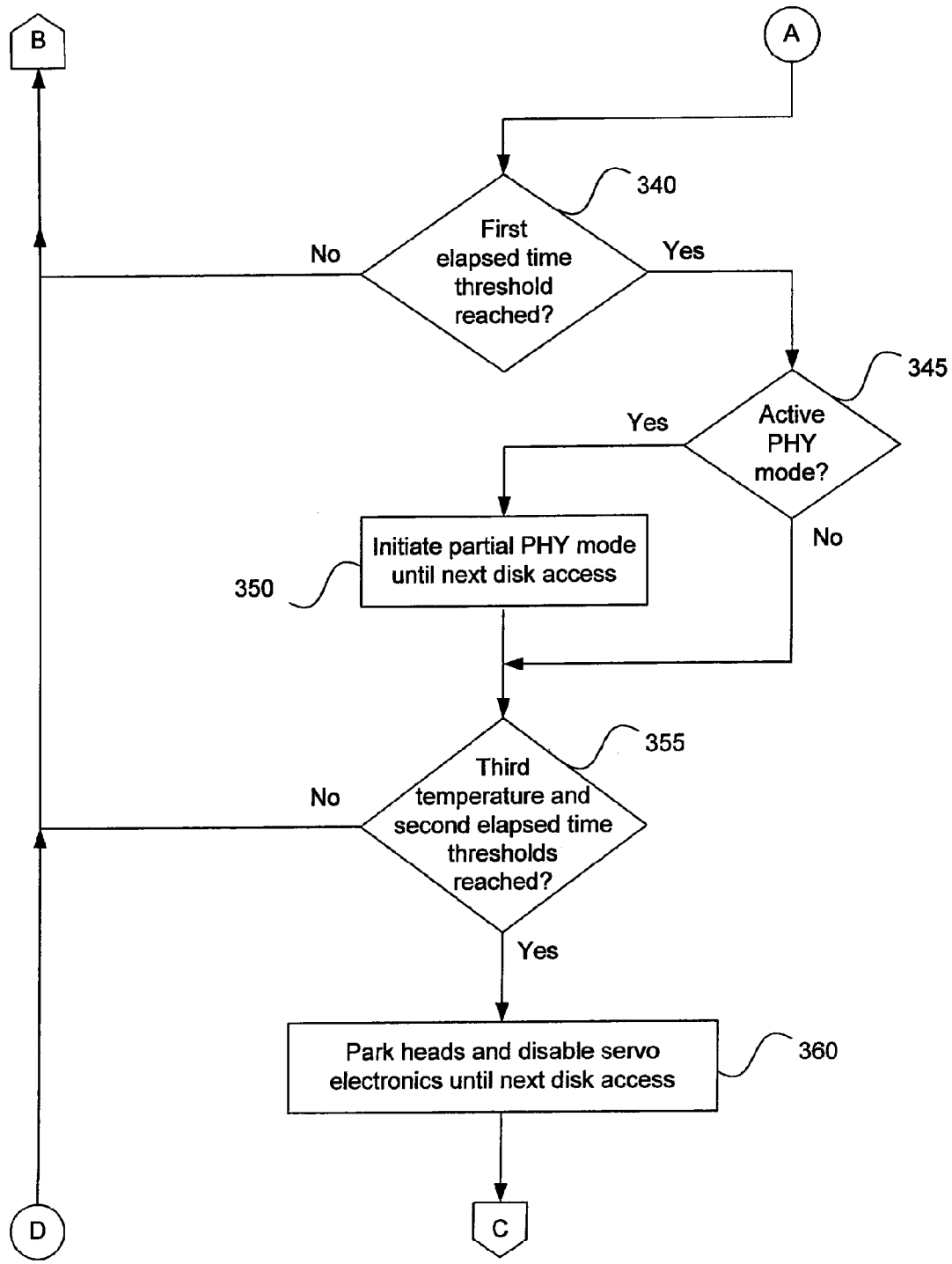
Figure 3C:
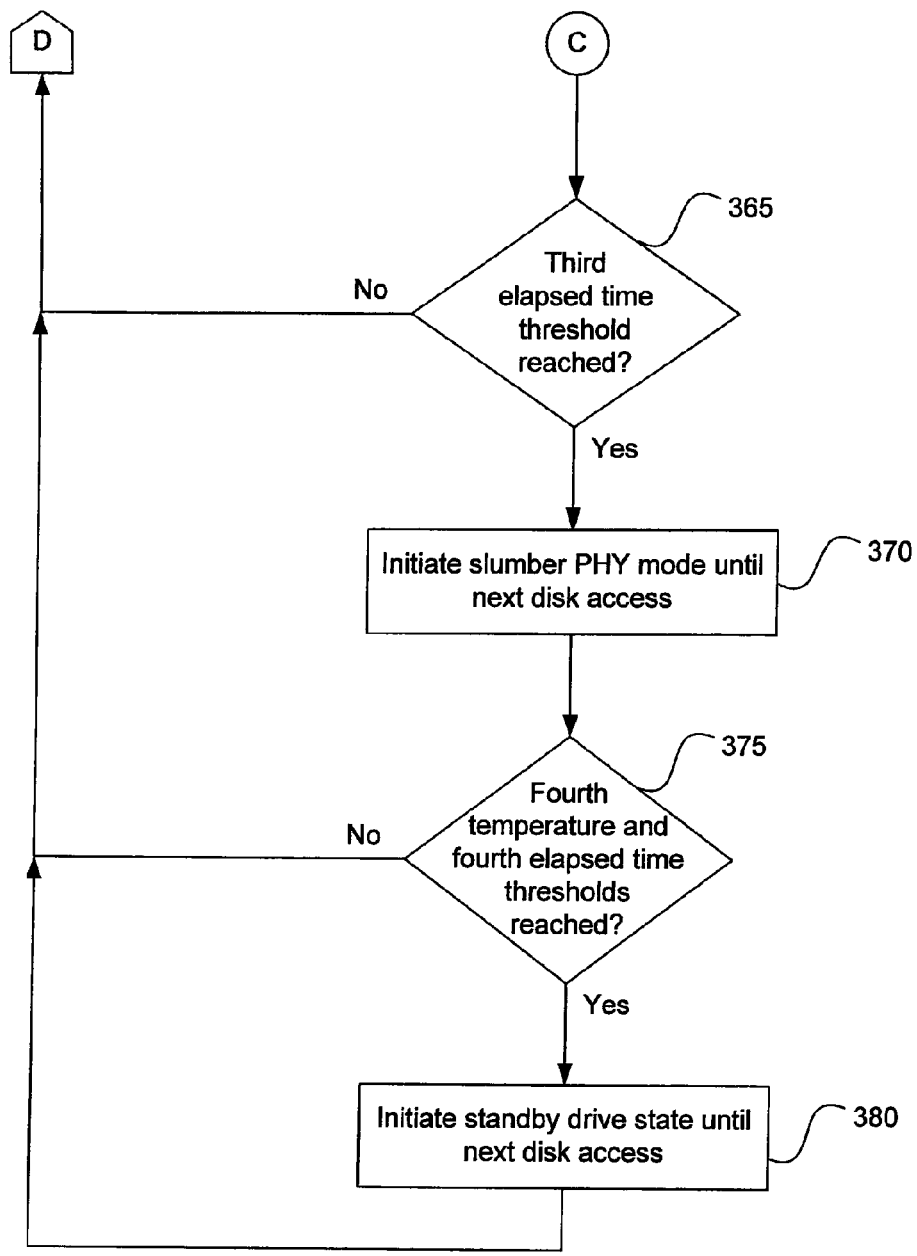

FIGS. 3A through 3C are representational flow charts illustrating one technique that can be used to implement the various power-reduction mechanisms that are enumerated in Table 1. At 305 the improved hard drive 200 continuously monitors both its temperature and the elapsed time since the host last sent a command. Certain power-saving techniques require long wake-up times to resume functionality. As will be more fully described later, these techniques would typically not be used if the storage device were being continuously accessed.

At 310 the system determines whether a first temperature threshold was reached. Before this threshold is reached, at 315 the improved hard drive 200 fully implements all offline activities. However, once the temperature reaches a first threshold, it suspends the offline activities at 320. The first temperature threshold can be keyed to the operating parameters of the improved hard drive 200. For example, if the improved hard drive 200 is subject to increased risk of failure at temperatures over 65° C., then a good choice for the first temperature threshold might be about 50° C.

After the first threshold is reached, the system continues to monitor whether the temperature reaches a second threshold at 325. As long as the system temperature is between the first and the second thresholds, the only remedial action the improved hard drive 200 would take is suspending the offline activities. Once the temperature reaches the second threshold, the silent seek mode would be initiated at 330. If suspending the offline activities and reducing the seek mode succeeded in reducing the temperature, then the improved hard drive 200 can revert to performance seek mode at 335. The second threshold might be a few degrees over the first threshold. If the second threshold were equal to the first threshold, then the suspension of offline activities and the reduction of the seek mode would occur simultaneously.

At 340 the system determines whether a first time threshold has been reached. Generally, the time threshold would be related to the amount of time necessary to revert the system back to operational status from the remedial action. The remedial action at 350 is placing the interface into a partial PHY operating mode from the active PHY operating mode. Since it only takes a few microseconds to wake the interface up from partial to active, an appropriate first time threshold might be about 5 seconds of inactivity. The improved hard drive 200 checks whether the interface is active PHY mode at 345 prior to placing the interface into partial PHY mode so that the system does not inadvertently increase the power consumption by upgrading the interface from slumber mode into partial mode (placing the interface into slumber mode is described later at 370). The interface would typically revert back to active mode at the next disk access. Alternatively, logic can be implemented that reverts the interface back to active mode if the temperature drops below a threshold temperature.

At 355 the system determines whether a third temperature and a second elapsed time threshold is reached. If both thresholds are reached then at 360 the improved hard drive 200 will park its heads and disable the servo electronics until the next disk access (or, alternatively, until the temperature drops below some predefined level). The third temperature threshold might be a few degrees over the second temperature threshold and the second elapsed time threshold might be from 30 seconds to a minute.

At 365 the system determines whether a third elapsed time threshold is reached, which can be between two and five minutes of inactivity. If enough time has passed, and the temperature still needs to be reduced, then the improved hard drive 200 would initiate a slumber PHY operating mode request at 370.

Similarly, at 375 the system determines whether a fourth temperature threshold and a fourth time threshold is reached. The temperature threshold might be a few degrees below the maximum temperature for the improved hard drive 200, and the elapsed time can be between five and ten minutes of inactivity. At 380 the system would initiate the standby drive state until the next disk access. If such measures do not reduce the temperature, and the temperature exceeds the maximum operating temperature for the improved hard drive 200, then drastic actions might need to be taken, such as shutting down the drive or notifying the host that it must take immediate remedial actions.

Generally, the techniques of the present invention may be implemented on software and/or hardware. For example, they can be implemented in an operating system, in a separate user process, in a library package bound into network applications, or on a specially constructed machine. In a specific embodiment of this invention, the technique of the present invention is implemented in software embedded within the control system of a mass storage device.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and higher level code that may be executed by the computer (e.g., using an interpreter).

Although illustrative embodiments and applications of this invention are shown and described herein, many variations and modifications are possible which remain within the concept, scope, and spirit of the invention, and these variations would become clear to those of ordinary skill in the art after perusal of this application. For example, the times, temperatures and remedial actions described above can be easily adjusted to operate in different conditions. Accordingly, the present embodiments are to be considered as illustrative and not restrictive, and the invention is not to be limited to the details given herein, but may be modified within the scope and equivalents of the appended claims.

What is claimed is:

1. A method for a peripheral device to regulate its temperature by regulating its power consumption, comprising:
   suspending only offline diagnostic activities if the temperature of the peripheral device exceeds a first temperature, wherein a user's experience of the peripheral device is not affected;
   reducing operational speed in which the peripheral device fulfills requests from a host device if the temperature of the peripheral device exceeds a second temperature; and
   reducing power consumption of a physical layer interface that connects the peripheral device to the host device if the peripheral device exceeds a third temperature and if the peripheral device experienced a period of inactivity that exceeds a first time threshold.

2. The method of claim 1, wherein the peripheral device is a mass storage device and wherein:
   the physical layer interface has different power modes; and
   the power consumption of the mass storage device is reduced by changing the power mode of the physical layer interface.

3. The method of claim 2, wherein the power mode of the physical layer interface reverts back to its original mode when the host device attempts to use the mass storage device.

4. The method of claim 2, wherein the power mode is changed if a period of inactivity where the host device has not used the mass storage device has elapsed.

5. The method of claim 4, wherein the mass storage device can be placed into a standby state, and wherein power consumption is reduced by placing the mass storage device into the standby state if the period of inactivity where the host device has not used the mass storage device has elapsed.

6. The method of claim 2, wherein the power mode is changed from active to partial.

7. The method of claim 6, wherein the power mode is changed from partial to slumber.

8. A mass storage device comprising:
   (a) an integrated controller;
   (b) a storage element;
   (c) a temperature sensing element;

(d) a physical layer interface that connects the mass storage device to a host device;

wherein, the temperature sensing element monitors the temperature of the mass storage device and provides a temperature value to the integrated controller;

wherein the integrated controller suspends only offline diagnostic activities if the temperature value exceeds a first temperature threshold, wherein the experience of the user of the mass storage device is unaffected;

wherein the integrated controller reduces the operational speed in which the mass storage device fulfills requests from the host device if the temperature value exceeds a second temperature threshold; and wherein the integrated controller reduces the power consumption of the physical layer interface if the temperature value exceeds a third temperature threshold and if the mass storage device experienced a period of inactivity that exceeds a first time threshold.

9. The mass storage device of claim 8, wherein the physical layer interface that connects the mass storage device to a host device has different power modes and the power consumption is reduced by changing the power mode.

10. The mass storage device of claim 9, wherein the integrated controller reverts the power mode of the physical layer interface back to its original mode when the host device attempts to use the mass storage device.

11. The mass storage device as recited in claim 8, wherein the mass storage device is incorporated into a computing system.

12. The mass storage device as recited in claim 11, wherein the computing system includes a processor in communication with the mass storage device.

13. A computing device, comprising:
a mass storage device; and
a processor configured to regulate the temperature of the mass storage device by regulating its power consumption by, suspending only offline diagnostic activities if the temperature of the mass storage device exceeds a first temperature, wherein a user's experience of the mass storage device is not affected, reducing operational speed in which the mass storage device fulfills requests from a host device if the temperature of the mass storage device exceeds a second temperature, and reducing power consumption of a physical layer interface that connects the mass storage device to the host device if the mass storage device exceeds a third temperature and if the mass storage device experienced a period of inactivity that exceeds a first time threshold.

14. The computing device of claim 13, wherein:
the physical layer interface has different power modes; and
the power consumption of the mass storage device is reduced by changing the power mode of the physical layer interface.

15. The computing device of claim 14, wherein the power mode of the physical layer interface reverts back to its original mode when the host device attempts to use the mass storage device.

* * * * *